(12) United States Patent
DeKoning

(10) Patent No.: US 6,275,898 B1
(45) Date of Patent: Aug. 14, 2001

(54) METHODS AND STRUCTURE FOR RAID LEVEL MIGRATION WITHIN A LOGICAL UNIT

(75) Inventor: Rodney A. DeKoning, August, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/311,316

(22) Filed: May 13, 1999

(51) Int. Cl.$^7$ .................................................. G06F 12/00
(52) U.S. Cl. ......................................................... 711/114
(58) Field of Search ............................... 711/114; 714/6, 714/7

(56) References Cited

U.S. PATENT DOCUMENTS

| | | | |
|---|---|---|---|
| 5,392,244 | 2/1995 | Jacobson et al. | 365/200 |
| 5,479,653 | 12/1995 | Jones | 395/182.03 |
| 5,519,844 | 5/1996 | Stallmo | 395/441 |
| 5,546,558 | 8/1996 | Jacobson et al. | 395/441 |
| 5,657,468 | 8/1997 | Stallmo et al. | 395/441 |
| 5,659,704 | 8/1997 | Burkes et al. | 395/441 |
| 5,664,187 | 9/1997 | Burkes et al. | 395/621 |
| 5,666,512 | 9/1997 | Nelson et al. | 711/114 |

OTHER PUBLICATIONS

MegaRAID's Flex RAID Advanced Management Software; 1 page; Worldwide Web.
AM RAID Management; 1 page; Worldwide Web.

*Primary Examiner*—Matthew Kim
*Assistant Examiner*—Christian P. Chace

(57) ABSTRACT

Methods and structures for defining partitions within a RAID storage system LUN such that each partition is managed in accordance with RAID management techniques independent of the other partitions. The total data storage of the LUN is subdivided and mapped into a plurality of partitions also referred to as partitions. Initially, each partition is configured and mapped to run as a RAID level 1 mirrored storage area. As performance and storage capacity needs as measured for each partition dictate, a partition of a LUN may be reconfigured to use a different RAID level (i.e., level 3 or 5) to reduce overhead storage needs at the cost of decreased write performance. A partition may later be returned to RAID level 1 as performance needs so indicate. Each partition is therefore managed in accordance with its own RAID level of management. The partitions of a LUN may expand to incorporate unused space in an adjacent partition or unused space in the LUN may be compacted and consolidated in one area of the LUN such that the partitions are moved to fill holes in the LUN storage capacity.

15 Claims, 11 Drawing Sheets

METHODS AND STRUCTURE FOR RAID LEVEL MIGRATION WITHIN A LOGICAL UNIT

BACKGROUND OF THE INVENTION

1. Field of the Invention

The present invention relates to disk array storage systems and more specifically relates to methods and structure for enabling RAID management level migration with a logical unit of a disk array storage system.

2. Discussion of Related Art

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures is automated within the storage subsystem itself due to the use of data redundancy, error codes, and so-called "hot spares" (extra storage modules that may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks* (RAID), reviews the fundamental concepts of RAID technology.

There are six common "levels" of standard geometries generally known in present storage systems. The simplest array that provides a form of redundancy, a RAID level 1 system, comprises one or more disks for storing data and an equal number of additional mirror disks for storing copies of the information written to the data disks. The remaining RAID levels, identified as RAID level 2–6 systems, segment the data into portions for storage across several data disks. One of more additional disks are utilized to store error check or parity information. Striping is a technique of distributing the data (and redundancy information) over a plurality of drives in the storage system. This technique improves overall performance by using concurrency to reduce the wait time involved in larger I/O operations. Rather than waiting for a single disk drive to respond to a larger I/O request, several drives are involved in concurrent processing of the I/O request. Some of the RAID management levels (i.e., RAID level 5) include striping as an integral part of the management technique. RAID level 1 may optionally include striping to improve its performance as compared to non-striped mirrored implementations. Some in the industry refer to RAID level 1 with striping as RAID level 10.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability. Frequently RAID subsystems provide large cache memory structures to further improve the performance of the RAID subsystem. The cache memory is associated with the control module such that the storage blocks on the disk array are mapped to blocks in the cache. This mapping is also transparent to the host system. The host system simply requests blocks of data to be read or written and the RAID controller manipulates the disk array and cache memory as required.

The various RAID levels are distinguished, in part, by their relative performance capabilities as well as their overhead storage requirements. For example as regards overhead storage capacity, a RAID level 1 "mirrored" storage system requires more overhead storage than, for example, a system using RAID levels 2–5 that utilize XOR parity to provide requisite redundancy. RAID level 1 requires as much storage capacity for redundancy information (duplicated copies of all data) as for the actual stored data. By contrast, RAID level 5 requires 1/N of the storage capacity used for storing data where N is the number of data disk drives used in the particular RAID storage system.

RAID management levels also differ in their performance characteristics. RAID level 5, for example, is known to impose a performance penalty on write operations. The redundancy information maintained by RAID level 5 management forces an update to parity information even when a relatively small amount of user data is updated. To update the parity requires reading other portions of the data unaffected by the particular write operation and then requires an extra write operation to actually update the parity data. By contrast, mirrored RAID level 1 management techniques impose no such penalty. The updated data and redundancy (mirrored) data are simply written in parallel.

A number of partial solutions are known in the art to reduce the impact of this well known write penalty. However, the penalty cannot be eliminated in all environments.

In view of these overhead and performance distinctions, it is desirable to tune a storage subsystem's use of RAID management techniques to a particular application. In some applications it may be preferred the improved performance of RAID level 1 be used for high performance at a cost of additional overhead storage requirements. In other applications, the write penalty of RAID level 5 management may be acceptable in exchange for the reduced overhead storage requirements.

AutoRAID systems available from Hewlett-Packard Company utilize management techniques that attempt to automatically manage the use of, for example, RAID level 1 and RAID level 5. These AutoRAID management techniques maintain at least two portions to a storage subsystem. A first portion is maintained in accordance with RAID level 1 management techniques to maximize performance. A second portion is maintained in accordance with RAID level 5 management techniques to reduce storage overhead requirements. Data that is being frequently accessed is automatically "migrated" from the slower RAID level 5 portion to the faster RAID level 1 portion to improve overall system performance. Data that is moved from the RAID level 5 portion to the RAID level 1 portion is said to be "promoted" because the data is promoted from a lower performance RAID configuration to a higher performance RAID configuration. Conversely, the opposite conversion is referred to as "demotion" because the data is "demoted" from a higher performance RAID configuration to a lower performance configuration.

In general, storage systems in which multiple RAID management techniques are used to map and relocate data as needed for optimal space utilization or for performance are referred to as hierarchical. Hierarchical storage systems define a hierarchy of storage areas or media such that higher levels of the hierarchy are distinguished from lower levels of the hierarchy based upon various performance or other measurable characteristics. As noted above with respect to HP AutoRAID, data is managed within such hierarchical storage systems to provide a preferred level of performance or other characteristic for the data.

Presently known RAID storage subsystems manage data in the storage subsystem in units referred to as logical units or LUNs. A particular LUN is a subset of the storage space within the storage subsystem. As presently known in the art, a storage controller applies a particular RAID management geometry and technique to the data stored in that LUN. The Hewlett-Packard AutoRAID solutions utilize relatively complex log structure file system techniques to map all data in a particular logical unit (LUN) of the storage subsystem. In general, meta-data structures are utilized in managing log structure file system to map each block of data in the LUN. Data is exchanged between the portions of the storage subsystem in concert with the complex log structure file system (LFS) techniques. The log structure mapping information is used to locate each block in one of the two portions of the storage subsystem.

The meta-data structures associated with the log structure file system are usually manipulated as dynamic memory data structures. Such dynamic data structures are allocated or created and de-allocated or destroyed as required in manipulation of the log structure. Dynamic manipulation of such data structures comprises a significant degree of overhead processing in addition to the overhead storage requirements of the log structure meta-data structures. Dynamic memory management techniques usually involve processing to allocate, de-allocate and compact (i.e., garbage collection). The log structure file system associated with the Hewlett-Packard AutoRAID systems is therefore costly as measured in overhead storage requirements for the log related meta-data structures. The LFS technique is also complex and costly in performance due processing of the log related meta-data structures that must be accessed for each data block manipulated on the user's behalf.

Presently known hierarchical storage systems are therefore complex and hence costly. It is desirable to reduce the complexity of providing such hierarchical RAID level migration capability in hierarchical storage systems.

SUMMARY OF THE INVENTION

The present invention solves the above and other problems, thereby advancing the state of the useful arts, by providing simpler techniques for managing hierarchical storage areas in a storage system. In particular, the present invention provides for defining partitions of storage space within a logical unit. For example, a single RAID logical unit (LUN) may be broken up into a plurality of partitions. Each partition of the LUN is managed in accordance with a preferred storage management technique. For example, a first partition of the LUN may be managed in accordance with RAID level 1 mirroring techniques to improve performance at the cost of added storage overhead. Another partition of the LUN may be managed in accordance with RAID level 5 techniques to reduce overhead storage requirements at the cost of lower performance. Each partition may be converted (migrated) between the various supported RAID storage management techniques as desired in accordance with the performance requirements of that data and the storage capacity for that data. For example, partitions in which the data is being frequently accessed may be converted to RAID level 1 mirroring to improve performance at the cost of increased storage overhead. Such frequently accessed data may also be referred to herein as "hot" data. Conversely, partitions that are less frequently accessed or that are usually accessed in large write operations (having reduced or no write penalty costs) may be converted to RAID level 5 or RAID level 3 partitions to reduce the storage overhead requirements. Such infrequently accessed data may also be referred to herein as "old" or "cold" data.

In accordance with the present invention, partitions are initially defined as RAID level 1 mirrored partitions. The partitions are converted to other RAID levels (such as level 3 or 5) as the controller determines that storage capacity requirements and access patterns to data in the partitions suggests such conversion would be beneficial. In like manner, performance and access monitoring by the controller permits conversion of a partition back to the initial RAID level 1 mirroring where performance can be improved.

Each partition retains its own configuration and mapping information. Each partition is therefore managed essentially as though a separate RAID LUN. Higher level meta-data identifies which partitions are members of a particular LUN and which portions of the LUN data are recorded in each partition. Since the meta-data structures of the present invention track partitions (aggregations of blocks) rather than individual blocks, the volume of such meta-data and the processing required to manage such meta-data is reduced by comparison to, for example, Hewlett-Packard AutoRAID hierarchical solutions.

A further aspect of the present invention allows the partitions to be dynamically reconfigured to adjust the size of the partitions within a LUN. Where a RAID level 1 partition is converted to a RAID level 3 or 5, the size of the partition may be reduced because RAID levels 3 and 5 require less overhead storage for the same amount of stored data. The change from, for example, RAID level 1 to RAID level 3 or 5 is also referred to herein as compaction with regard to the space utilization because the same amount of user data is stored in less storage space. The unused space may be recovered by moving all subsequent partitions into the area of unused space so as to consolidate (compact) all unused space at the end of the LUN. Conversely, when a partition is restored to RAID level 1 from, for example, RAID level 3 or 5, additional space may need to be added to the partition to restore or expand the partition to its original size. Other partitions following the partition to be promoted back to RAID level 1 are moved down in the pool of unused space at the end of the LUN. The partition to be promoted may then be expanded by adding unused storage space to permit use of the higher performance RAID level 1 management.

The partitioned LUN of the present invention therefore provides for simplified dynamic adjustment of the configuration and management of a RAID storage system to adapt the storage system to desired performance and storage utilization goals.

It is therefore an object of the invention to provide methods and structure to enable automatic reconfiguration of a storage system to optimize for performance and storage utilization goals.

It is a further object of the invention to provide methods and structure to enable automatic reconfiguration of a RAID LUN within a storage subsystem to optimize for performance and storage utilization goals.

It is still a further object of the invention to provide methods and structures to define partitions within a LUN of a storage system.

It is another object of the invention to provide methods and structures to define partitions within a LUN of a storage system such that each partition is managed in accordance with a storage management technique independent of the other partitions.

It is still another object of the invention to provide methods and structures to define partitions within a LUN of RAID a storage system such that each partition is managed in accordance with a RAID storage management technique independent of the other partitions.

The above and other objects, aspects, features, and advantages of the present invention will become apparent from the following description and the attached drawing.

DETAILED DESCRIPTION OF THE PREFERRED EMBODIMENTS

Figure 1:
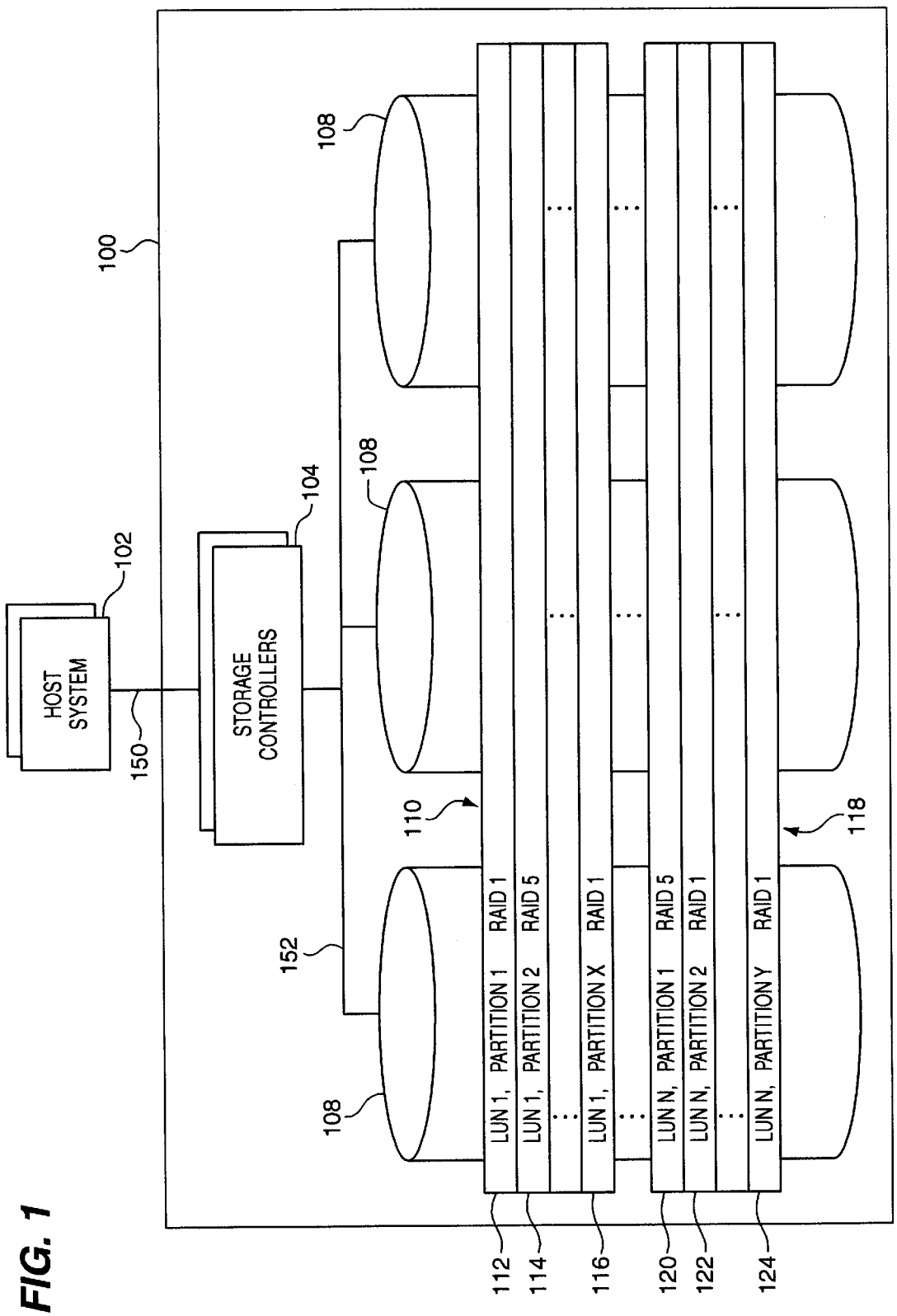
FIG. 1 is a block diagram of a system in which the LUN partition management of the present invention is applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system operable in accordance with the present invention. One or more host systems 102 store and retrieve data in storage system 100 by exchanging commands and data via communication path 150. One or more storage controllers 104 within storage system 100 are operable to process I/O requests on behalf of the hosts systems 102 to store host supplied data in the storage system 100 and to retrieve previously stored data from the storage system 100. Such data is stored on and retrieved from disk drives 108. Controller 104 manages disk drives 108 via communication path 152.

Those skilled in the art will recognize that communication path 150 may be any of several well known communication media and protocols for exchange of commands and data between the storage system 100 (via the storage controllers 104) and the host systems 102. For example, path 150 may utilize parallel SCSI, Fibre Channel, SSA, etc. In like manner, path 152 connecting storage controllers 104 to disk drives 108 may be any of several well known communication media and protocols also including parallel SCSI, Fibre Channel, SSA, etc.

Where storage system 100 is a RAID system that provides redundancy to assure data integrity and storage system reliability, those skilled in the art will recognize that many of the components are redundant and operable in concert to assure reliable operation despite partial failures within the system 100. For example, communication paths 150 and 152 may be redundant to permit continued operation despite loss of one of the communication paths. Controllers 104 may be in redundant multiples to permit continued operation through failure of one of the multiple controllers and to permit enhanced performance through parallel processing of I/O requests within the multiple controllers where there is no failure.

RAID systems include a plurality of disk drive 108 and distribute data thereon so as to help assure data integrity in case of failures of some of the disk drives. The storage controllers 104 map host supplied data onto the multiple disk drives 108 in accordance with any of several RAID management levels as noted above. Some RAID systems permit a user to define multiple logical units (LUNs) mapped over the plurality of disk drives 108. Each logical unit as presently practiced in the art is managed in accordance with one of the RAID management levels as configured by the user.

In contrast to the present invention, HP AutoRAID solutions define two portions within a single LUN. A first portion is managed in accordance with RAID level 1 and a second portion is managed in accordance with RAID level 5. Hot data (frequently accessed) is moved from the RAID level 5 portion to the RAID level 1 portion. Conversely, cold data (less frequently accessed) is moved from the RAID level 5 portion to the RAID level 1 portion. Log structured file system mapping techniques map the present location of each block of data so that the actual physical location of the block is transparent to the user. The boundary between the RAID level 1 portion and the RAID level 5 portion of the LUN is dynamically adjusted as data is moved between the two portions.

As shown in FIG. 1 by way of example, two LUNs, specifically LUN 1 110 and LUN N 118, are defined and mapped onto three disk drives 108. Those skilled in the art will recognize that any number of LUNs may be configured on the disk array within the scope of the present invention.

Each LUN 110 and 118 has a plurality of partitions configured therein in accordance with the present invention. In particular, LUN 1 110 shows partitions 112 through 116 and LUN N 118 shows partitions 120 through 124. Each partition is managed using RAID techniques largely independent of the other partitions of the LUN. Still more specifically by way of example, partitions 112 and 116 of LUN 110 are managed in accordance with RAID level 1 techniques while partition 114 is managed in accordance with RAID level 5 techniques.

As required for performance measurement, such as storage space utilization and access time and frequency, each partition is converted between the various RAID levels supported by the controllers 104. For example, where access time is critical to the observed disk access and where the storage space is available in a partition, the partition may be converted to RAID level 1 mirrored operation. As noted above, RAID level 1 provides superior performance as compared to other RAID levels but at the cost of increased overhead storage capacity. Conversely, where storage requirements so dictate, a partition may be converted from RAID level 1 to RAID level 5 to reduce overhead storage requirements at the cost of degraded write performance (write penalty). Each partition is so managed independent of the other partitions of the LUN and transparently with respect to host systems.

In the present invention, individual blocks need not be mapped as in HP's AutoRAID solutions. Rather, the contents of each particular partition, in its entirety, is identified in a meta-data structure associated with the partition. The mapping of blocks within the partition is in accordance with the standard RAID management level applied to the partition rather than a complex log structure file system.

Changing a partition of a LUN from a lower level of performance of RAID management to a higher level (i.e., from RAID level 5 to level 1) is also referred to herein as promotion of the partition. Conversely, changing from a higher level of RAID performance to a lower level (i.e., from level 1 to level 5) is also referred to herein as demotion of the partition. It should be understood that promotion and demotion is not to be construed as connoting a positive aspect or negative aspect of the action. Both actions may be referred to herein as "RAID level migration" or simply "migration" to eliminate any such connotation of positive or negative aspects in the RAID level migration process.

Further, the initial size of each partition may be altered as required to adapt to increases in the storage capacity requirements of a partition. For example, where access time is deemed critical for a partition based upon measures of access patterns, it is important to retain RAID level 1 management for that partition. If the storage overhead requirement to maintain RAID level 1 high performance is not presently available in the partition, unused space in the LUN may be added to the partition to permit continued RAID level 1 operation in that partition. Unused space may be allocated from another adjacent partition or pooled within the LUN as discussed further below. Conversely, if a partition is converted to, or is presently managed in accordance with, RAID level 5 management techniques, that partition may have excess, unused space. Such unused space may be merged with an adjacent partition in need of space or may be added to the unused space pool of the LUN as discussed further below. Each partition may thereby grow or shrink in accordance with its present storage capacity requirements.

Partitions in a LUN are preferably allocated in contiguous adjacent space within the storage space allocated to the LUN. As partitions are expanded or reduced in size, gaps of unused space may be created in the storage space of the LUN. The LUN may be periodically compacted so as to pool all unused space in a preferred location of the LUN such as at the end of the LUN storage space. Such compaction moves the data of each partition to a new location to compact the unused space. Conversely, where a partition is expanded, subsequent partitions in the LUN are moved further into the storage space of the LUN (into the pool of unused space) to make room for expansion of the partition.

Unused space within LUNs of the storage system may also be utilized to expand other LUNs or to create new LUNs in accordance with standard disk array management techniques. Unused space taken from a LUN to expand or create another LUN may leave the original LUN smaller than it was originally configured. When a partition in such a LUN needs to be expanded (i.e., migrated from RAID level 5 to RAID level 1), additional space may be necessary to perform the desired expansion. If the space is not presently available in the LUN, unused space from other LUNs may be used to expand the total space of the LUN to permit expansion of the relevant partition.

Details of the partition configuration and management methods and structure of the present invention are discussed further herein below.

Figure 2:
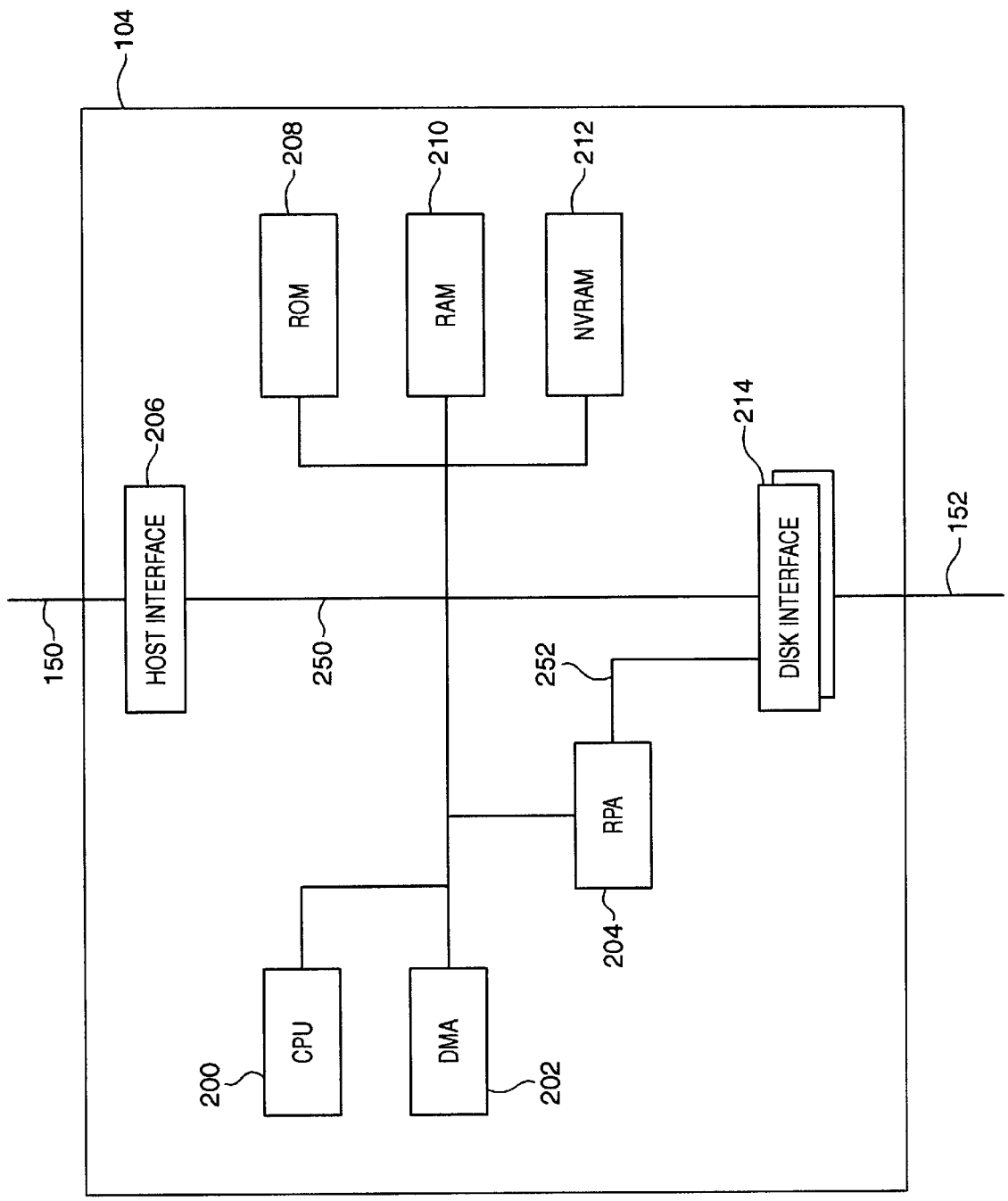
FIG. 2 is a block diagram of a storage controller of FIG. 1 in which the methods of the present invention are operable.

FIG. 2 is a block diagram providing additional detail of an exemplary embodiment of a storage controller 104 of FIG. 1. CPU 200 controls overall operation of methods operable within controller 104. Methods operable therein are generally stored as programmed instructions in ROM 208 and/or RAM 210. RAM 210 provides storage space for cache memory operations to cache frequently and/or recently accessed data. RAM 210 also stores data and meta-data used to manage the LUNs of the storage system and the partitions defined within those LUNs. Configuration information regarding the controller 104 and other devices in the storage system are retained in non-volatile memory 212 (NVRAM).

CPU 200 interfaces with memories 208, 210 and 212 via processor bus 250. CPU 200 communicates with host systems via host interface 206 and communicates with disk drives via disk interface 214, both accessible via processor bus 250. DMA 202 is adapted to perform direct memory access transactions between the memory devices (i.e., RAM 210) and either host interface 206 or disk interfaces 214. DMA 202 thereby reduces processing overhead on CPU 200 where large data block transfers are required. RPA 204 is situated intermediate the disk interfaces 214 and the processor bus 250. RPA 204 (RAID Parity Assist) monitors transfers of data between disk interfaces 214 and other devices on processor bus 250 such as RAM 210 via DMA 202. RPA 204, under control of CPU 200, computes XOR parity values corresponding to data exchanged with the disk drives. Such parity computations are the basis for generating and checking redundancy data used in conjunction with (for example) RAID levels 2–6.

Controller 104 as shown in FIG. 2 is merely exemplary of a controller design in which the methods and structure of the present invention are applicable. Those skilled in the art will recognize a variety of alternative controller architectures that may embody the methods and structures of the present invention. In particular, a number of architectural improvements are well known in the art to isolate particular busses for particular types of data transfers within the storage controller. Such bus structures help improve overall storage system performance by avoiding contention for high speed data transfers. The controller of FIG. 2 is therefore intended as a general description of any controller architecture that may embody the methods and structure of the present invention to improve performance of a storage subsystem by defining partitions within each LUN and enabling modifications to such partitions in response to measured performance parameters.

Figure 3:
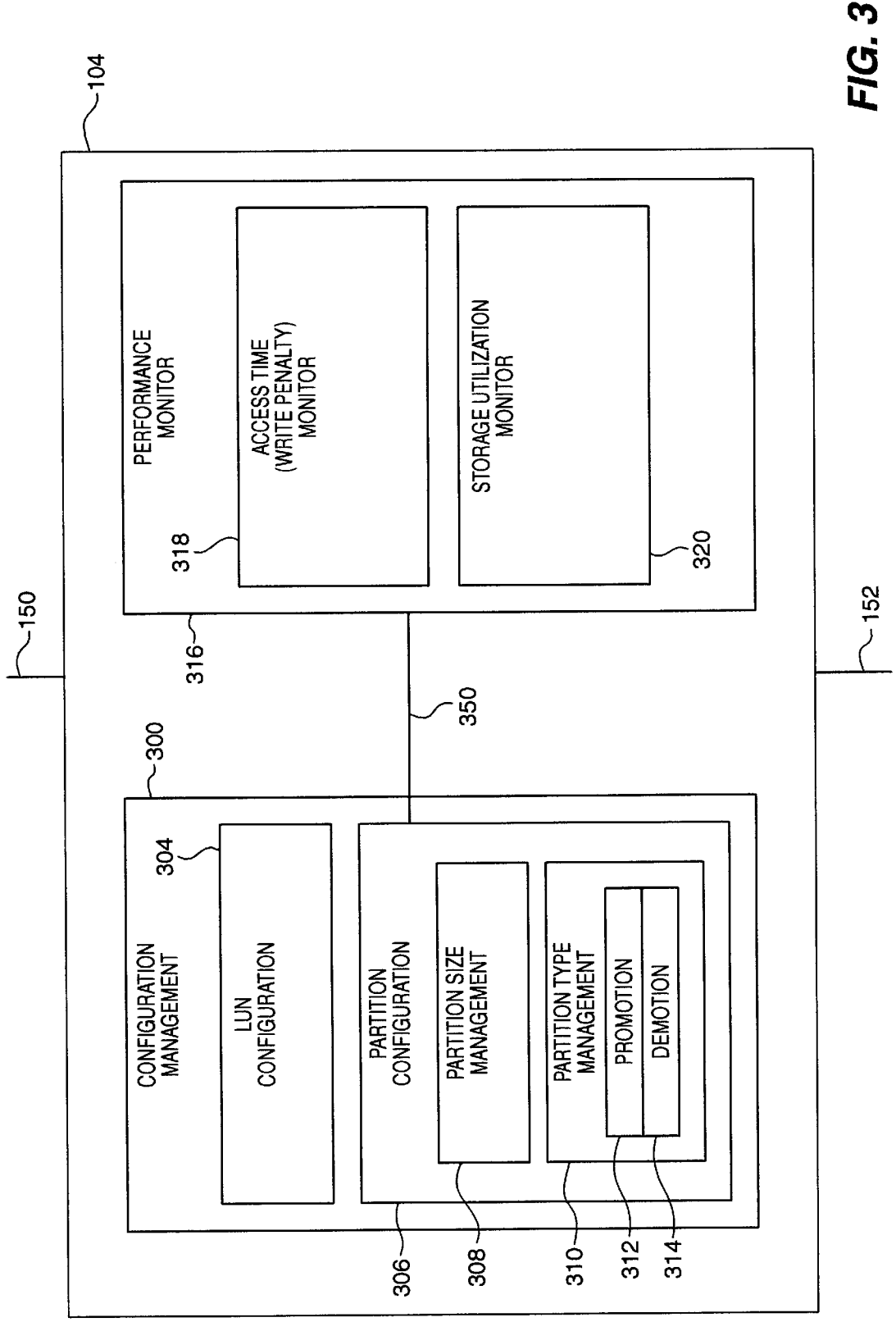
FIG. 3 is a block diagram describing the functional elements of the present invention operable within the storage controller of FIGS. 1 and 2.

FIG. 3 is a block diagram that describes storage controller 104 in terms of the functional operations performed therein by the methods of the present invention. As discussed above, these functional elements are preferably operable as programmed instructions fetched from a memory (ROM 208 of FIG. 2) and executed by the processor (CPU 200 of FIG. 2) of controller 104.

A configuration manager 300 receives performance information from performance monitor 316 via inter-process communication path 350. Performance monitor 316 gathers data that identifies partitions of LUNs for which observed (measured) patterns of access indicate that the data therein is frequently accessed for write operations or otherwise accessed in a manner that significantly benefits from improved write access. Conversely, performance monitor 316 also gathers data that indicates that a partition is not accessed in a manner that requires high performance write access.

Performance monitor 316 monitors for a number of performance characteristics to determine whether and when a partition should be migrated to another RAID level. In particular, by way of example, performance monitor 316 measures such characteristics as write operation to read operation ratio and write frequency. Partitions which are frequently written (i.e., contain hot data) and/or which have a high ratio of writes versus reads may be appropriate partitions to be migrated to RAID level 1 to improve write operation performance. Partitions which appear to be dominated by high bandwidth write operations may be best migrated to RAID level 3. A high bandwidth write operation is one which provides a large volume of data in each write operation such as video data capture or other high performance data logging storage applications. By contrast, partitions that have a low write frequency (i.e., contain cold data) or a low ratio of write operations to read operations may be migrated to RAID level 5 management to reduce the storage capacity requirement of the partition. Performance monitor 316 also detects partitions whose allocated storage space is over-utilized or under-utilized. Those that are under-utilized are potential candidates for reduction in size while those that are over-utilized may need additional space.

Configuration manager 300 responds to such gathered performance information by reconfiguring the partition as appropriate for the observed performance information. For example, configuration manager may determine that a partition's RAID management level should be altered to improve overall system performance and/or improve storage capacity utilization. Functional elements within configuration manager 300 perform various tasks in this configuration and reconfiguration. LUN configuration manager 304 is operable to initialize a LUN in accordance with the user's desired LUN configuration. LUN configuration manager 304 also works in conjunction with partition configuration manager 306 to determine the number of partitions in the LUN and the initial size of each partition in the LUN. The size and number of partitions may be determined as a set number of partitions whose size is simply the total LUN size divided by the set number of partitions. Alternatively, the initial size and number of partitions may be determined as a fixed size partition where the number is determined as the total LUN space divided by the fixed size per partition. In still another alternative, the size and number of partitions may be determined by an intelligent estimate of the expected access patterns of the partitions based upon user supplied descriptions of the anticipated usage. In the preferred embodiment, an administrative user may configure the number and size of partitions as a parameter at creation of the LUN.

In like manner, partition manager 306 is also operable to determine the initial RAID management level to be associated with each partition. In the preferred embodiment, each partition is initialized to operate as under a RAID level 1 mirrored management mode. This is the preferred embodiment so that performance is initially optimized for all portions of the LUN. As access patterns are later determined by performance monitor 316, configuration manager 300, by way of partition type manager 310, may demote the partition. As noted above, a demotion describes the operation of changing the RAID management level of a partition from a higher level of performance (i.e., RAID level 1) to a level of RAID management (i.e., RAID level 5) with lower performance. This reduces storage space utilization at the cost of slower access (i.e., due to write penalty of, for example, RAID level 5). Conversely, as space allows and as access patterns may suggest, a previously demoted partition may again be promoted to a higher performance level of RAID management (i.e., from level 5 to level 1) in response to a determination that access patterns would significantly benefit from such a promotion and a determination that space is available in the partition to do so. As noted above, migration to RAID level 3 management may be preferred for partitions dominated by high bandwidth write operations.

Promotion and demotion of a partition is managed by promotion manager 312 and demotion manager 314, respectively, within partition type manager 310. Promotion manager 312 is also referred to herein as a "partition promoter." Demotion manager 314 is also referred to herein as a "partition demoter." Where the partition size need be adjusted, partition size manager 308 within partition configuration manager 306 oversees the operation. Re-sizing of partitions may involve moving data in other partitions to either expand or compact a partition within the LUN.

Size management involves adjusting the size of a partition in accordance with its presently assigned RAID management level. In the preferred embodiment, a partition's size should be set to contain a pre-determined fixed amount of user data. This amount of data plus the overhead storage required by the presently assigned RAID management level determines the presently required partition size.

For example, in a LUN mapped over three disk drives a partition intended to contain up to 10 MB of user data would require 20 MB of space when managed in accordance with RAID level 1 mirroring and only 15 MB of storage space when managed in accordance with RAID levels 3 or 5. FIGS. 4 through 8 depict a sequence of changes in partition space usage in such a LUN mapped over three disk drives.

Figure 4:
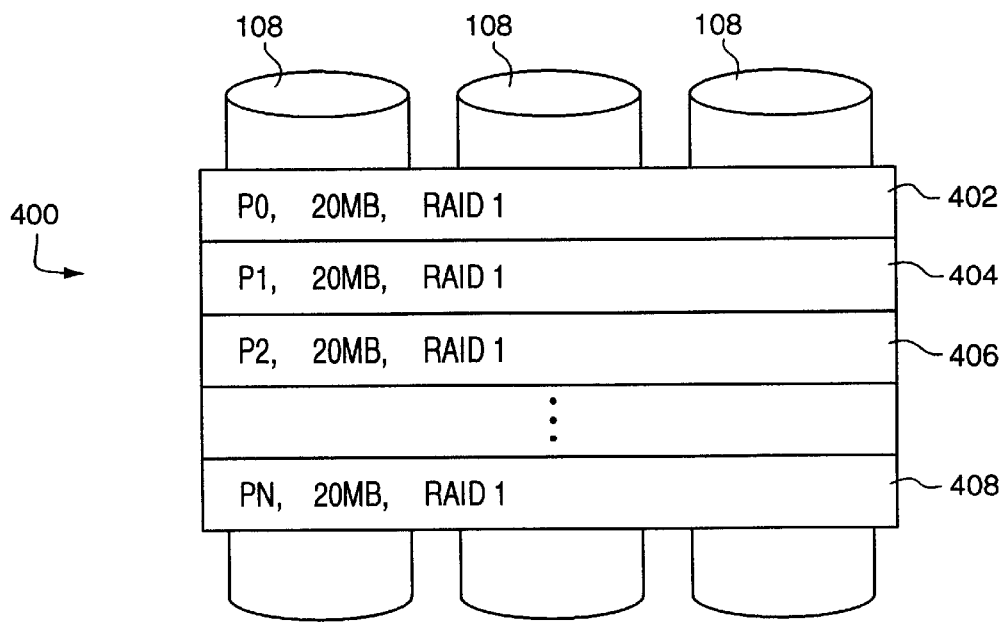
FIGS. 4–8 are block diagrams describing a sequence of partition promotions and demotions and corresponding compactions.

FIG. 4 shows an initial state of a LUN 400 mapped over three disk drives 108. The LUN is divided into N 20 MB partitions 402 through 408 in accordance with the present invention. Initially, each partition is 20 MB in size and is managed in accordance with RAID level 1 mirrored techniques to provide high performance. Under RAID level 1 management techniques, a 20 MB partition may contain 10 MB of user data and 10 MB of mirrored user data.

Figure 5:
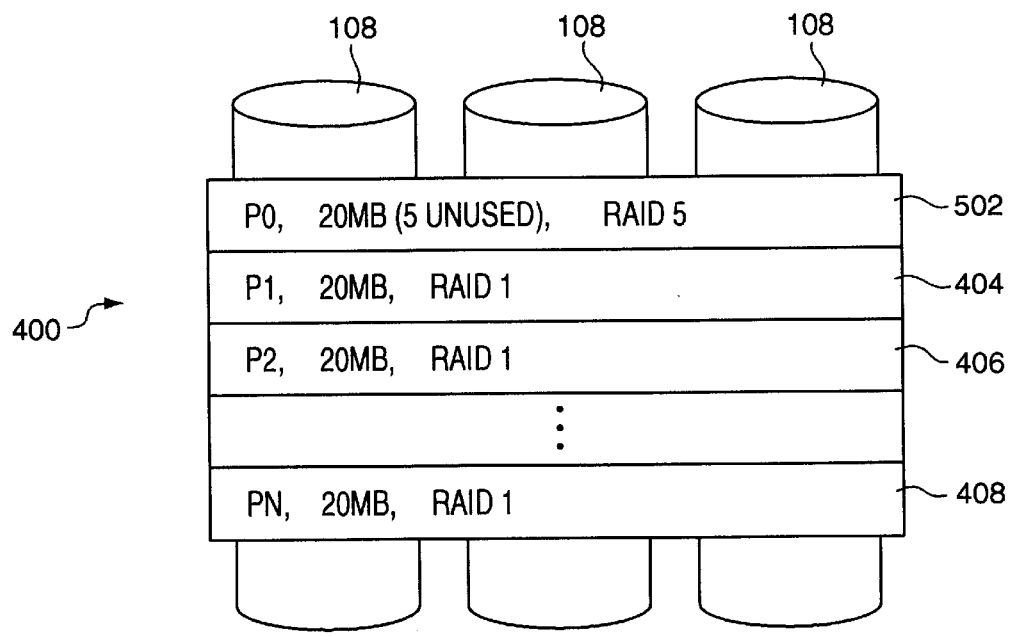

As performance monitoring so indicates, access to data in the first partition 402 may not require such high performance. FIG. 5 therefore show the first partition 502 migrated (demoted) to RAID level 5 management techniques. The demotion changes the RAID management technique and notes that 5 MB of the partition's 20 MB storage space is now unused. RAID level 5 management on three disk drives requires only 15 MB of space to store the same 10 MB of user data with XOR parity redundancy data.

Figure 6:
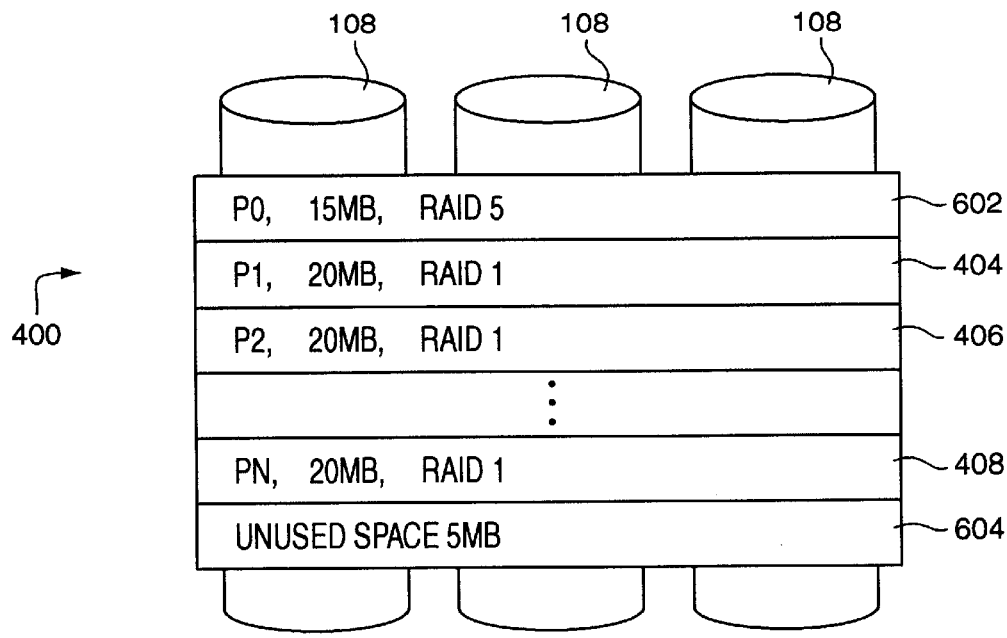

FIG. 6 then depicts a next state wherein the first partition's unused space has been compacted. Partition 602 (the first partition) now indicates that its size is 15 MB rather than the original 20 MB. The all other partitions (404 through 408) have been moved up to fill the space previously occupied by the unused 5 MB of the first partition as shown in FIG. 5. The unused space is therefore pooled at the end of the LUN as 5 MB of unused space 604.

Figure 7:
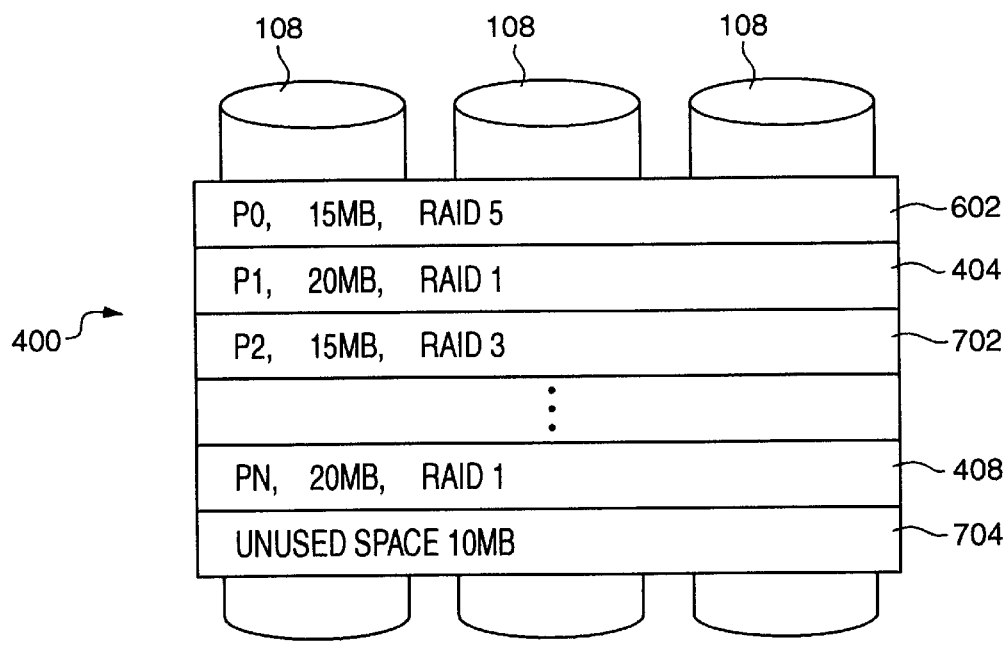

In FIG. 7, another partition 702 (the third partition) has been migrated (demoted) from RAID level 1 to RAID level 3. The migration and resulting compaction are shown as a single step in the transition from FIGS. 6 to 7. That is, partition 702 is shown to have been demoted to RAID level 3 and simultaneously compacted to 15 MB. Simultaneously, remaining partition 408 has been moved up so that the additional 5 MB of unused space is added to the pool at the end of the LUN. The pooled unused space 704 is now 10 MB.

Figure 8:
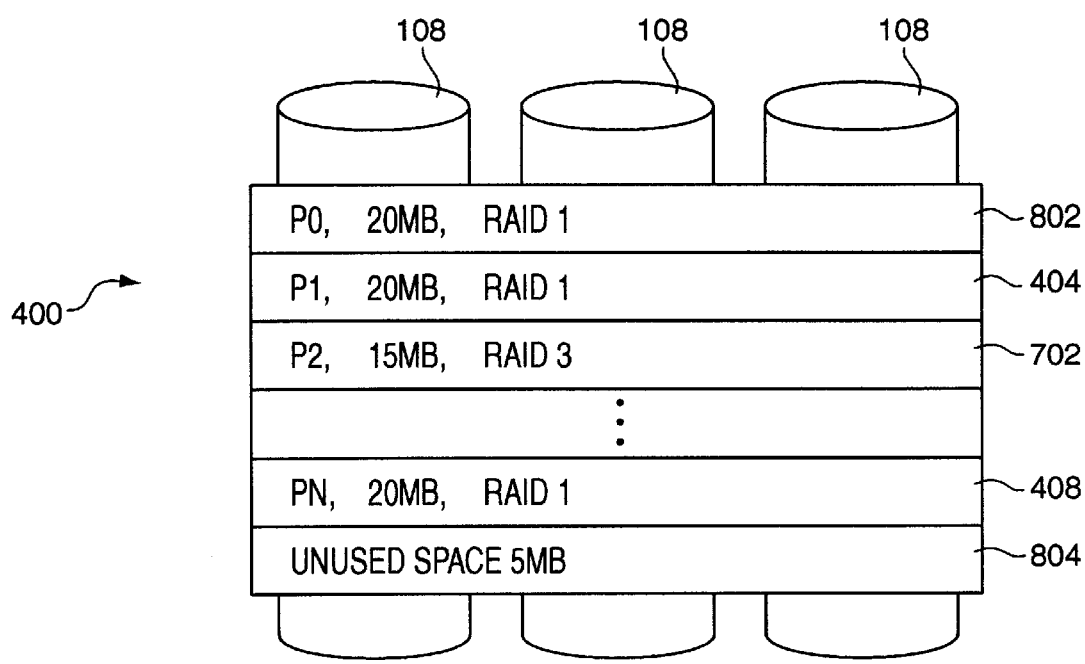

FIG. 8 shows another transition wherein the first partition 802 has been promoted back to RAID level 1 management. The additional space required to do so is taken from unused space 804 that is now reduced to 5 MB of unused space. Partitions 404, 702 and 408 are moved down in the LUN to permit the expansion of the size of partition 802.

Those skilled in the art will recognize that the configuration and sequences described in FIGS. 4 through 8 are intended merely as exemplary of use of the present invention in one environment. The number of disks used for a LUN and therefore the degree of compaction realized may be different than described above within the scope of the present invention. Similarly, the initial number and size of partitions may be any values useful in a particular application. FIGS. 4 through 8 are therefore intended merely as aids in explaining the features of the present invention are not to be construed to limit the application of the present invention to the exemplary environment depicted.

Figure 10:
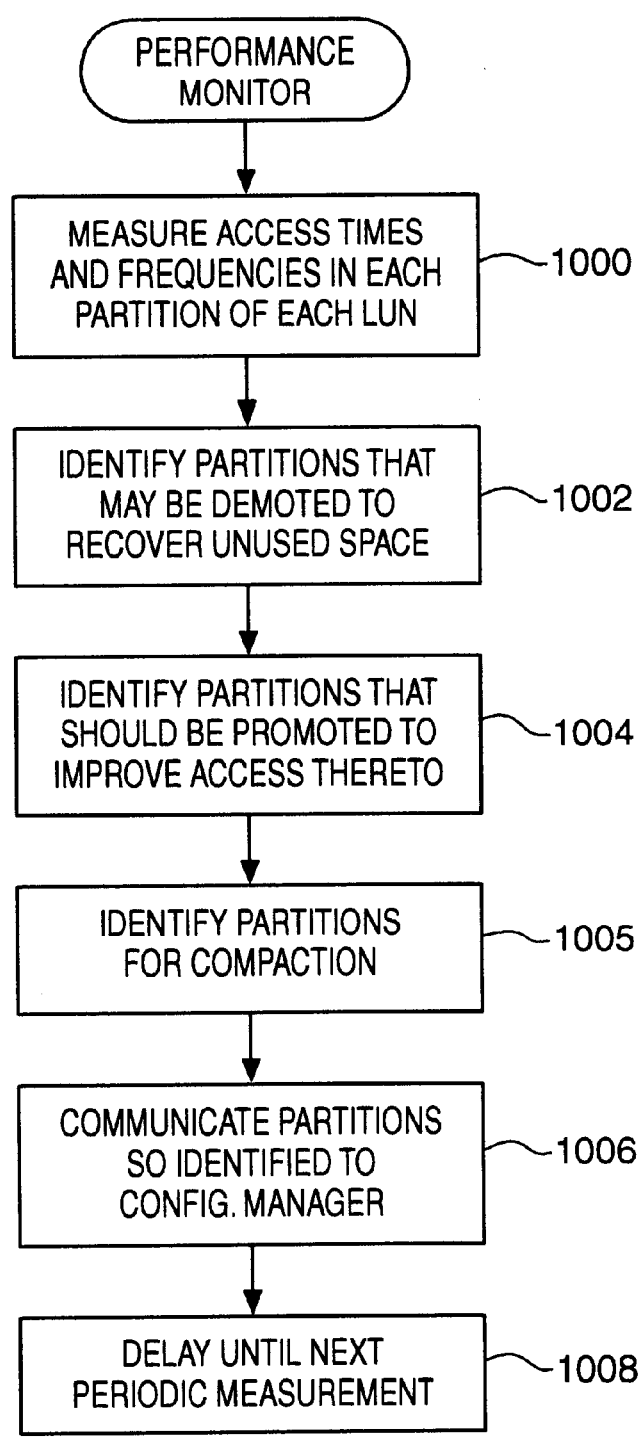
FIG. 10 is a flowchart describing a performance monitoring method of the present invention for identifying partitions to be promoted or demoted.

FIG. 10 is a flowchart describing the operation of performance monitor 316 of FIG. 3. As noted in FIG. 3, the performance monitor includes elements for measuring access time to the storage subsystems as well as storage utilization. The performance monitor therefore seeks to optimize access time for frequently accessed data while minimizing storage overhead utilization for less frequently accessed data. Those skilled in the art will recognize a variety of well-known statistical methods for monitoring such performance criteria. Any such statistical methods may be utilized as a matter of design choice in conjunction with the performance monitor of the present invention. As noted above by way of example, the performance monitor measures such parameters as write request frequency, write/read ratio, write bandwidth, etc.

Elements 1000 of FIG. 10 is first operable to measure the access times and frequencies for each of the plurality of partitions of each logical unit (LUN) defined in the storage subsystem. Based on this accumulated data, element 1002 is then operable to identify partitions that may be demoted from higher performance RAID management (i.e., level 1) to another RAID management level so as to conserve storage subsystem disk space (i.e., RAID level 3 or 5). As noted above, RAID level 1 maximizes storage overhead utilization in a RAID logical unit by duplicating all stored data on one or more mirror disk drives. By contrast, other RAID management levels such as RAID levels 3, 5 and 6 utilize substantially less storage overhead capacity to assure similar reliability. Element 1002 is therefore operable to generate a list of partitions to be demoted from RAID level 1 to, for example, RAID level 5.

Element 1004 is next operable to identify partitions whose frequent access suggests that improved access time would significantly improve subsystem performance. For example, partitions previously demoted to RAID level 5 that are now being frequently accessed could be promoted back to RAID level 1. Element 1004 is therefore operable to generate a list of partitions to be promoted from, for example, RAID level 5 back to RAID level 1.

The specific threshold degree of benefit derived from such a promotion to justify the promotion is a matter of design choice and tuning of the invention to a specific application environment. In one exemplary preferred embodiment of the present invention, user configurable parameters may be defined to permit tuning of such determinations to specific applications. For example, a "cold threshold" user configurable parameter may be set which defines a partition not accessed in a defined period of time to be "cold" and therefore eligible for migration to RAID 3 or RAID 5 to conserve storage space. A "hot threshold" may be set to define a partition accessed more recently than a period of time to be "hot" and therefore eligible for migration to RAID level 1 to improve write performance. In like manner, other user configurable threshold parameters may be set to customize the hot/cold determination. Such other parameters may include write/read ratio thresholds, write bandwidth thresholds, etc. In the preferred embodiment, such parameters would be defined in high and low threshold pairs to permit a hysteresis in the range definition and to thereby avoid frequent changes in the partition management.

Element 1005 then determines which partitions are appropriately compacted at this time. As discussed herein, a partition that has been demoted from RAID level 1 to, for example, RAID level 5 has unused space associated with it. The unused space may be used to again promote this partition, may be used by other partitions in need of promotion or may be used to form new partitions associated with the LUN. Element 1005 determines that the unused space in such a partition is not likely to be required for promotion of this partition in the near future and may therefore be compacted to permit use of the unused space for other purposes. Threshold parameters similar to those discussed above may be defined to specify access patterns associated with the partition that determine the appropriateness of compaction of the partition at this time.

Element 1006 is then operable to communicate the list of partitions to be promoted, demoted and compacted to the partition configuration manager. As noted above well-known inter-process communication techniques are preferably utilized to exchange this list of information. Those skilled in the software arts will readily recognize a variety of alternate techniques for exchanging the information derived by performance monitor with the partition configuration manager. Further, those skilled in the art will recognize that the performance monitoring and resultant reconfiguration of partitions needn't of necessity be divided into distinct communication processes. Rather, the performance monitoring and analysis and resultant reconfiguration may be integrated into a single method and process. Many such equivalent computer process architectures will be apparent to those skilled in the art.

Finally, element 1008 is operable to delay a period of time until the next periodic measurements of partition access times and frequencies in each partition of each LUN. After the delay, processing then continues with a next periodic measurement by looping back to element 1000.

FIGS. 9A through 9D are flowcharts describing the operation of configuration management element 300 of FIG. 3 and more specifically describing operation of partition type management 310 of FIG. 3. As noted above, the configuration manager receives lists of partitions to be promoted and demoted as determined by the performance monitor. Element 900 is therefore operable to receive the lists of promotions and demotions to be processed by the configuration manager.

Elements and 902 through 908 are then iteratively operable to mark information associated with each partition so as to indicate whether the partition is to be demoted or promoted. Specifically, element 902 first determines whether there are additional partitions in the received lists of partitions to be processed. If not, processing continues with element 920 of FIG. 9B (at connector label A). Otherwise, element 904 is next operable to determine whether the performance monitor has requested that the particular partition be promoted or demoted. If the partition is to be demoted, element 906 marks of the partition to indicate such a demotion request and parameters of that request. Otherwise, element 908 is operable to mark of the partition to indicate that it promotion has been requested of that partition by the performance monitor. Marking of the partition preferably involves setting appropriate flags in a meta-data structure associated with each partition. Meta-data structures for each partition and each logical unit are used by the methods of the present invention to record data and status about the partitions and logical units. Such meta-data structures are preferably maintained within non-volatile memory associated with the controllers. The processing to actually promote or demote each partition follows as discussed further herein below. In both cases, processing continues by looping back to element 902 to process any remaining partitions in the list of partition promotions and demotions.

The partitions are preferably marked in advance of the actual processing so that processing of the requested the demotions and promotions may be performed in an optimal manner. Specifically, element 906 marks partitions for which demotion has been requested. Element 908 marks partitions for which promotion has been requested.

Figure 9A:
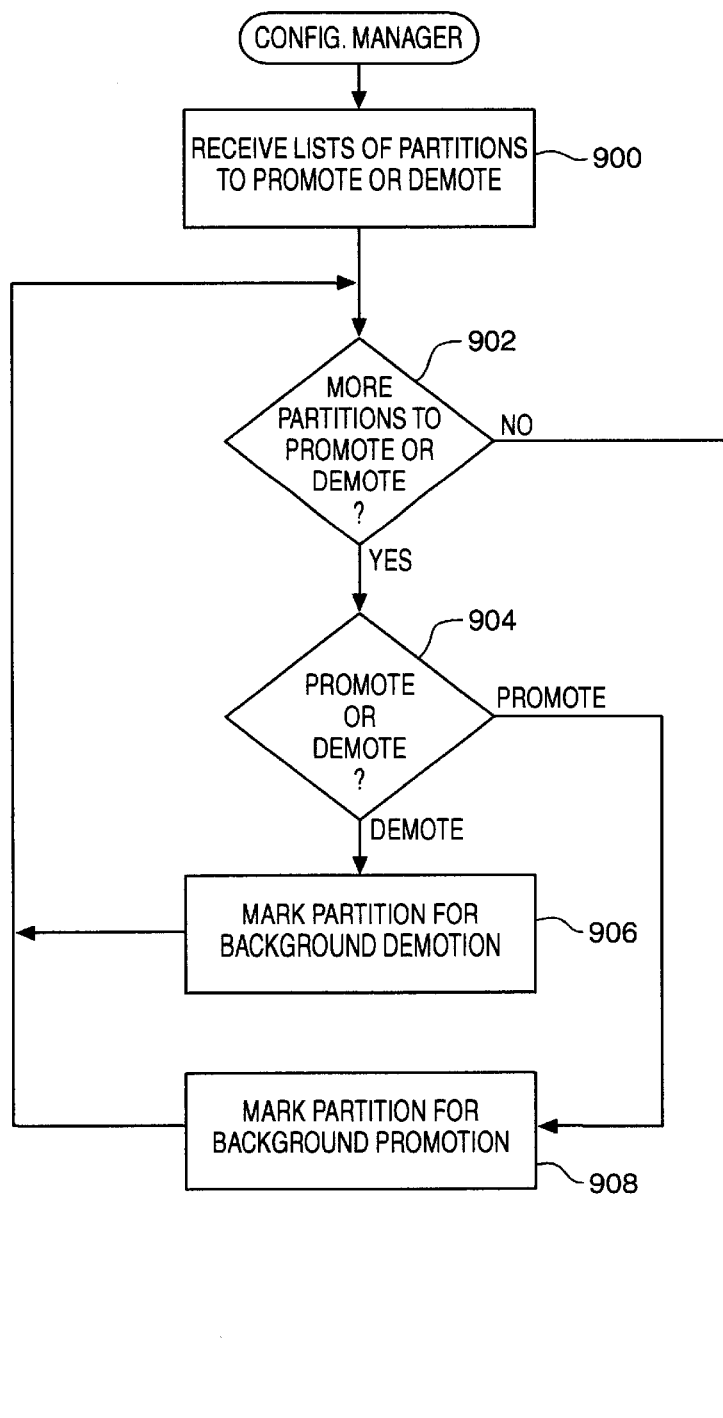
FIGS. 9A through 9D are flowcharts describing a configuration management method of the present invention to adjust the size of partitions in a LUN in response to performance monitoring data analysis.
Figure 9B:
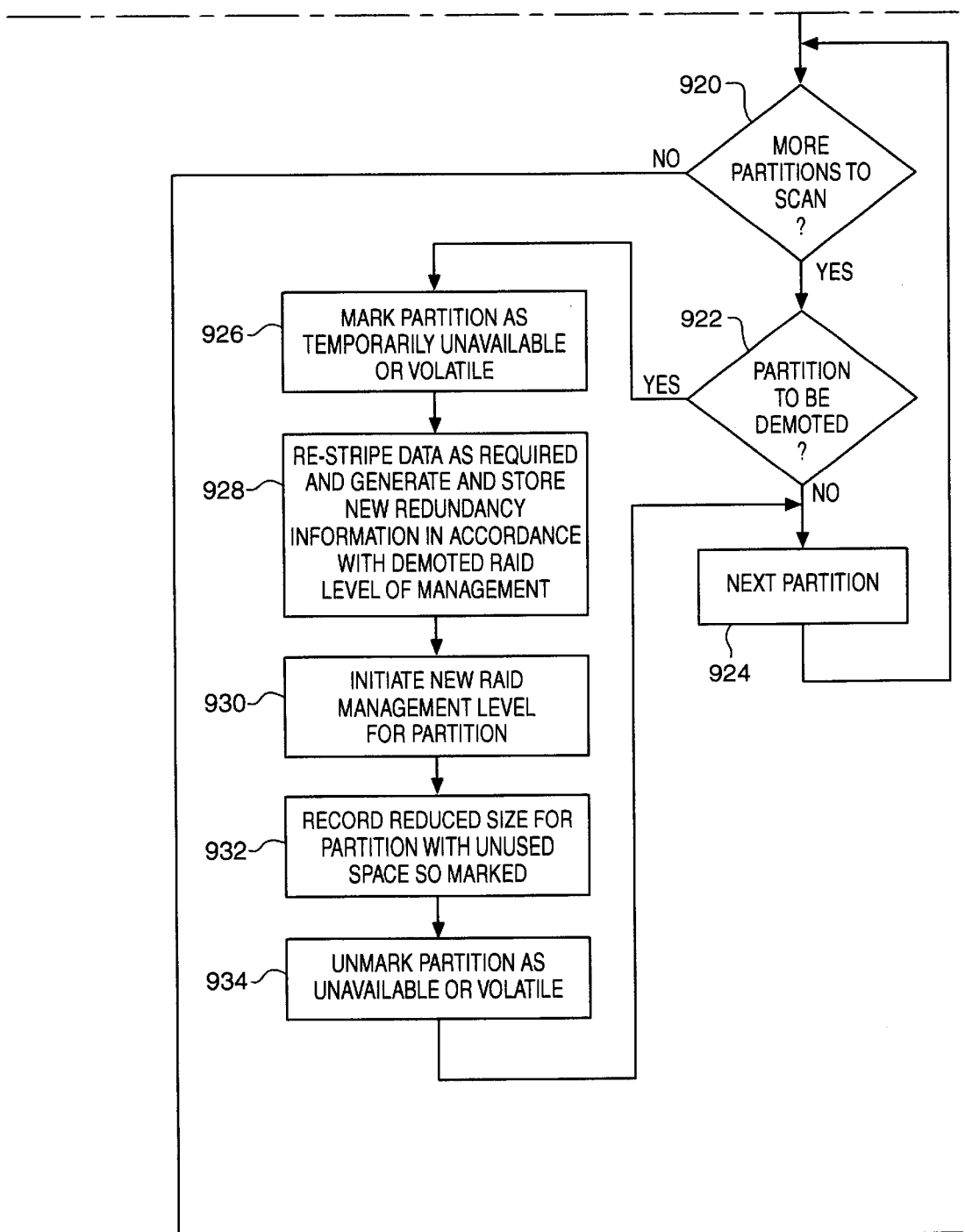

When element 902 determined that no further partitions have been identified in the list of partitions for promotion and demotion, processing continues with element 920 of FIG. 9B. Elements 920 through 934 are operable to scan all partitions and process those that have been marked for demotion. Demoted partitions are processed first so that free space made available by demoting a partition can be used where space is required to later promote a partition.

As noted above, determinations of partitions to be promoted or demoted are made using parameter threshold values having some hysteresis as part of the range definitions. This helps to avoid "thrashing" wherein a partition may be migrated frequently between various RAID levels. Further, configuration manager elements 920 through 962 (operable to actually promote or demote marked partitions) are operable on a relatively infrequent basis. Though the performance monitor may perform its designated measurements and determinations more frequently (applying statistical analysis techniques over longer periods of time), the actual configuration changes to be made are deferred to a less frequent basis to avoid thrashing of the storage system in frequent migrations of partitions between RAID management levels. In the preferred embodiment, operation of configuration manager to actually perform desired migrations of partitions between RAID levels may be carried out on a daily or even weekly basis. The frequency for such reconfiguration operations is preferably a user configurable parameter.

Specifically, element 920 is operable to determine whether more partitions remain to be scanned in the processing of elements 922 through 934. If all partitions have been so processed, processing continues with element 940 of FIG. 9C. If partitions remain to be processed, element 922 and 924 are operable to determine whether the next partition being scanned as been marked for demotion. If the partition is not so marked for demotion, element 924 is operable to switch the next partition, if any, and then continue processing by looping back to element 920.

If element 922 determines that the partition has been marked for demotion, processing continues with element 926 to mark the partition as temporarily, partially unavailable or otherwise volatile. While so marked as partially unavailable or volatile, the controller does not process further user requests for that portion of the partition that is in the process of being moved as part of a migration process. Normal write/read request processing in the partition monitors such availability and waits for the migration process to complete before processing a request that may be affected by the migration process. The requisite re-configuration of the partition may then proceed as described below with assurance that the migration process will not be impacted by continued write operation processing. Specifically, element 928 is operable to reconfigure the striping of data and to generate requisite redundancy information to be stored in the newly reconfigured partition. For example if the partition is to be demoted to RAID level 5, the data is striped over a plurality of the drives in the partition—drives that previously contained the mirrored copy of the data. Further, Exclusive OR (XOR) parity data is generated and stored interleaved with the striped data.

Element 930 is then operable to re-initialize RAID management of that partition to manage the partition in accordance with be newly demoted RAID management level. Next, element 932 is operable to record the reduced storage utilization of the newly configured partition. As noted herein demotion of a mirrored, RAID level 1 partition typically recovers storage space previously used for mirrored data (i.e., storage overhead comprising a complete duplicate of the original data). For example, RAID level 3 and RAID level 5 management generate XOR parity redundancy data that utilizes far less storage space than full duplication of data required by RAID level 1. Such unused storage space, now freed by demotion of the partition is marked as available for used by other partitions that may require expansion (enlarging the partition size to accommodate a partition promotion).

Lastly, element 934 un-marks the partition making it once again fully available and reliable (i.e., non-volatile). The storage controller may then resume normal I/O operations within the newly demoted partition of the logical unit. Processing then continues by the looping back to element 924 to continue processing other partitions of the logical unit for demotion.

Figure 9C:
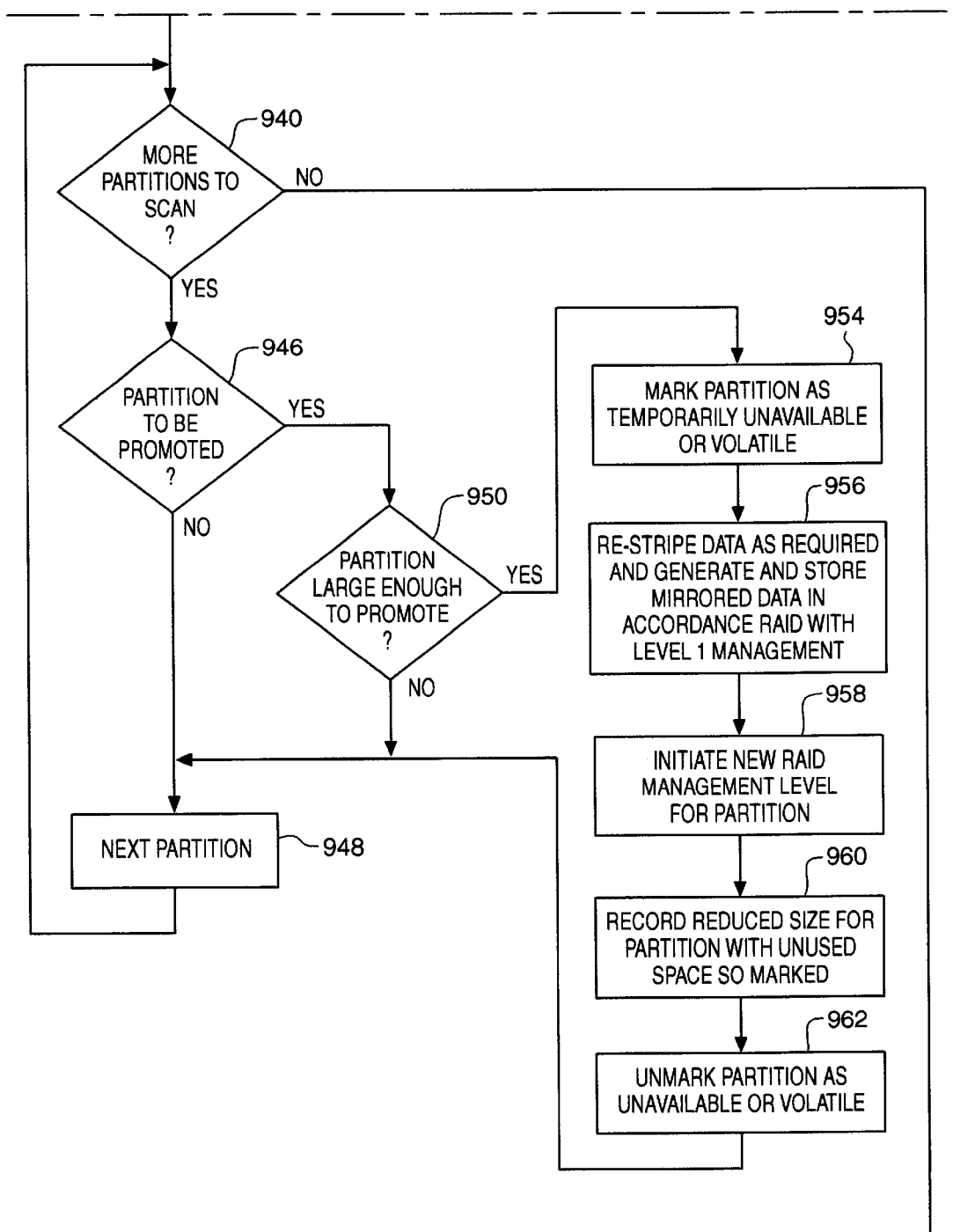

When element 920 determines that no further partitions remain to be processed for demotion, element 940 of FIG. 9C is then operable to initiate a similar scan of all partitions to process partitions for which promotion has been requested. As noted above, processing of promotions follows processing of demotion requests because promotions may require expansion of allocated space for a partition. By first processing all requested demotions, the method assures that the maximum unused free space will be available for such partition expansions due to promotion.

Element 940 is therefore operable to determine if partitions remained to be processed by operation of element 946 through 962. If processing of all partitions for promotion request is completed, the method continues at label "E" of FIG. 9D with element 970. If partitions remain to be processed, element 946 is next operable to determine whether the partition is one for which promotion has been requested. If not, element 948 is operable to switch processing to the next partition of logical unit. Processing then continues by looping back to element 940 to determine whether additional partitions remained to the processed.

Where element 946 determines that the present partition is one that has been marked for promotion, element 950 is then operable to determine whether the present size of the partition is large enough to permit promotion. As noted above, a demoted partition may free its space for use by other partitions. Since the partition to be promoted was previously demoted (all partitions preferably start as high performance RAID level 1 partitions), its unused space may have been re-allocated for use by another partition.

If such unused, freed space is in fact used by another partition, promotion may not be possible for this partition until the re-allocated, previously unused space is recovered for this partition. If element 950 determines that the partition is not large enough to permit promotion, processing continues by looping back to element 948 to check for other partitions marked for promotion. A partition marked for promotion that cannot be promoted at this time will be detected on a subsequent scan for such marked partitions. As noted above, the scan for partitions to be demoted or promoted is performed on a periodic basis. A later scan for partitions will detect this partition previously skipped for promotion and attempt to so promote the partition at a later scan.

When element 950 determines that the partition is now large enough to permit promotion, element 954 is operable to mark the partition as temporarily, partially unavailable or otherwise volatile. As noted above, a partition so marked as partially unavailable is carefully used by the controller for processing of I/O requests so as to cooperate with a migration process. Element 956 is then operable to reconfigure the striping of data and to generate the required mirrored data to permit the requested RAID level 1 management of the promoted partition. Those skilled in the art will recognize that the reconfigured partition may combine striping with RAID level 1 mirroring of the data.

Element 958 is then operable to initiate RAID level 1 management to of the newly configured partition. Element 960 is next operable to record the increased size of the partition. As noted above, methods of the present invention maintain meta-data structures that describe size and other attributes of the partitions and logical units in the storage system.

Lastly, element 962 is operable to un-mark of the partition making it once again fully available (i.e., non-volatile) for purposes of processing I/O requests. Processing then continues by looping back to element 948 to continue processing additional partitions marked for promotion.

Figure 9D:
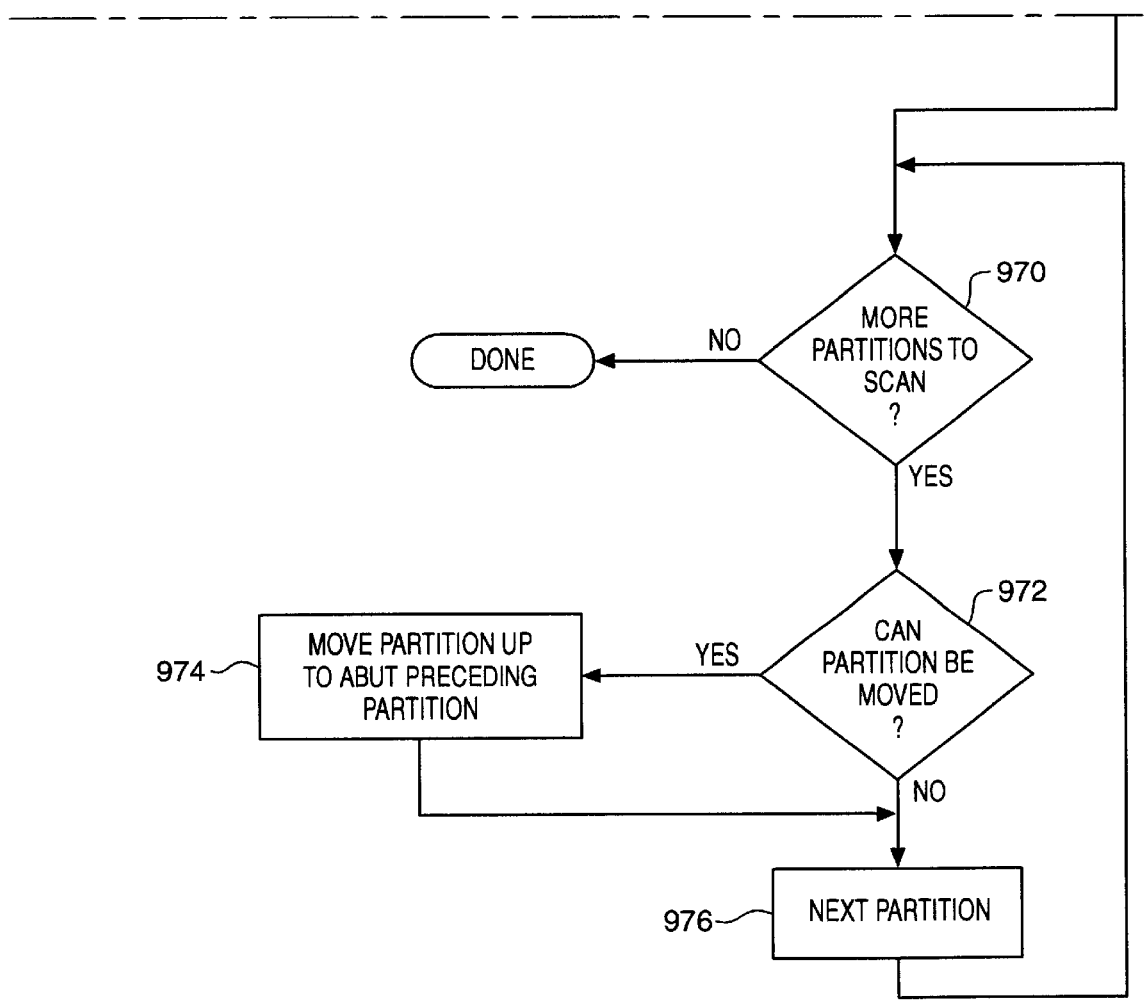

FIG. 9D continues the method of the present invention following scans for partitions to be demoted and partitions to be promoted. Those partitions that could be demoted or promoted have been so processed. This processing may leave gaps in the storage space of the LUN where demoted partitions have made space available. Elements 970 through 976 are therefore operable to compact the storage space of the LUN by moving partitions that follow such available space up into such a gap.

Those skilled in the art will recognize that the need or preferred time for compaction of a partition may be determined in accordance with performance metrics as discussed above with respect to FIG. 10. For example, a partition may first be demoted (i.e., from RAID level 1 to RAID level 5) due to recognition of access patterns to the partition. At a later time, in recognition of continued limited access to the partition, the partition may be marked for compaction reflecting the reduced likelihood of a need for promotion in the near future.

Element 970 is therefore first operable to determine whether more partitions remain to be scanned in this compaction scan of the partitions. If not, the method is complete and resumes again on a periodic basis in response to requests generated by the performance monitor. If partitions remain to be scanned, processing continues with element 972 to determine whether the present partition may be moved up into a gap in the storage space of the LUN that precedes the partition. If so, element 974 shifts the storage space allocated to the partition up into the gap immediately preceding the partition's storage space. In either case, processing then continues with element 976 to switch to the next partition in the compaction scan and then loop back to element 970 until all partitions that may be compacted are so processed.

Moving the partition up into an identified gap entails processing similar to that described above where the partition data may be marked as temporarily volatile or otherwise unavailable for a brief period of time until the partition data is completely moved to its new location. Meta-data associated with the partition is also updated to reflect the new physical location of the partition.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for enabling automatic reconfiguration of storage space in a storage system having a plurality of disk drives comprising the steps of:

defining a logical unit in said storage system as a subset of the storage space of said storage system;

configuring a plurality of partitions within said logical unit; and reconfiguring at least one partition of said plurality of partitions in response to measured parameters of operation of said storage system, wherein the step of reconfiguring is automatically operable within the storage system independent of any external operator.

2. The method of claim 1 wherein the step of configuring includes the step of assigning an initial storage management technique to each partition of said plurality of partitions, and wherein the step of reconfiguring includes the step of changing said storage management technique assigned to at least one partition of said plurality of partitions.

3. The method of claim 2 wherein the step of assigning comprises the step of initializing said each partition for RAID level 1 mirrored operation, and wherein the step of changing comprises the step of compacting data in said at least one partition to reconfigure said at least one partition for a RAID level of operation higher than RAID level 1.

4. The method of claim 3 wherein the step of reconfiguring further includes the step of restoring RAID level 1 mirrored operation to said at least one partitions.

5. The method of claim 1 wherein the step of configuring includes the step of allocating an initial storage space for each partition of said plurality of partitions, and wherein the step of reconfiguring includes the step of changing the allocated storage space of at least one partition of said plurality of partitions.

6. The method of claim 5 wherein the step of reconfiguring further includes restoring the allocated storage space of said at least one partition to said initial storage space.

7. A system comprising:

a plurality of disk drives; and a storage controller coupled to said plurality of disk drives and coupled to a host system to process I/O requests received from said host system wherein said storage controller includes:

a logical unit configuration manager operable to define a logical unit within said plurality of disk drives;

a partition configuration manager associated with said logical unit configuration manager and operable to define a plurality of partitions within said logical unit; and a performance monitor coupled to said partition configuration manager to measure parameters associated with operation of said storage system wherein said partition configuration manager is responsive to said performance monitor to modify configuration parameters of at least one partition of said plurality of partitions in response to measurements of said performance monitor, wherein said performance monitor and said partition configuration manager are automatically operable independent of any external operator.

8. The system of claim 7 wherein said performance monitor includes:

access time monitor for detecting a need for improved access time for data in any partition of said plurality of partitions; and storage utilization monitor for detecting a need for reduction in storage overhead utilization in any partition of said plurality of partitions.

9. The system of claim 8 wherein said partition configuration manager includes:

a partition type manager to modify a storage management technique associated with a partition in response to said performance monitor.

10. The system of claim 9 wherein each partition of said plurality of partitions is managed in accordance with a RAID storage management level and wherein said partition type manager includes:

a partition promoter to promote a partition to RAID level 1 management in response to detection of a need for improved access time.

11. The system of claim 9 wherein each partition of said plurality of partitions is managed in accordance with a RAID storage management level and wherein said partition type manager includes:

a partition demoter to demote a partition from RAID level 1 to another RAID level of management using less storage overhead in response to detection of a need to reduce storage overhead utilization.

12. The system of claim 9 wherein each partition of said plurality of partitions is managed in accordance with a RAID storage management level and wherein said partition type manager includes:

a partition demoter to demote a partition from RAID level 1 to another RAID level of management in response to detection of a need for increased bandwidth for access to said partition.

13. A storage controller for managing data storage on a plurality of disk drives in a storage system, said controller comprising:

means for defining a RAID logical unit comprising a subset of said plurality of disk drives;

means for defining a plurality of partitions within said logical unit;

means for monitoring performance of access to said RAID logical unit; and means, coupled with said means for monitoring performance, for reconfiguring said plurality of partitions in response to performance measurements of said means for monitoring performance, wherein said means for monitoring and said means for reconfiguring are automatically operable independent of any external operator.

14. The controller of claim 13 wherein said means for monitoring performance includes:

access time monitor means for detecting a need for improved access time for data in any partition of said plurality of partitions; and storage utilization monitor means for detecting a need for reduction in storage overhead utilization in any partition of said plurality of partitions.

15. The system of claim 14 wherein each partition of said plurality of partitions is managed in accordance with a RAID storage management level and wherein said means for reconfiguring includes:

partition promotion means for promoting a partition to RAID level 1 management in response to detection of a need for improved access time by said access time monitor means; and partition demotion means for demoting a partition from RAID level 1 to another RAID level of management using less storage overhead in response to detection of a need to reduce storage overhead utilization by said storage utilization monitor means.

* * * * *